(12) United States Patent
Kim et al.

(10) Patent No.: US 10,852,929 B2
(45) Date of Patent: Dec. 1, 2020

(54) VIDEO DISPLAY DEVICE AND METHOD FOR CONTROLLING THE SAME

(71) Applicant: LG Electronics Inc., Seoul (KR)

(72) Inventors: Hyongguk Kim, Seoul (KR); Dongkyu Lee, Seoul (KR); Hyeongjin Im, Seoul (KR); Yujune Jang, Seoul (KR); Eugene Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/295,252

(22) Filed: Mar. 7, 2019

(65) Prior Publication Data

US 2019/0278467 A1    Sep. 12, 2019

(30) Foreign Application Priority Data

Mar. 7, 2018  (KR) .................. 10-2018-0027032

(51) Int. Cl.
| | |
|---|---|
| G06F 3/048 | (2013.01) |
| G06F 3/0484 | (2013.01) |
| G06F 9/30 | (2018.01) |
| G06F 3/0481 | (2013.01) |
| G07C 5/08 | (2006.01) |
| G06Q 50/30 | (2012.01) |
| G07B 15/02 | (2011.01) |
| G07C 5/00 | (2006.01) |
| G06F 3/0488 | (2013.01) |

(52) U.S. Cl.
CPC ........ *G06F 3/04847* (2013.01); *G06F 3/0488* (2013.01); *G06F 3/04817* (2013.01); *G06F 9/3004* (2013.01); *G06Q 50/30* (2013.01); *G07B 15/02* (2013.01); *G07C 5/008* (2013.01); *G07C 5/085* (2013.01)

(58) Field of Classification Search
None
See application file for complete search history.

(56) References Cited

U.S. PATENT DOCUMENTS

| | | | |
|---|---|---|---|
| 2014/0059435 A1* | 2/2014 | Kim | G05B 15/02 |
| | | | 715/721 |
| 2015/0379437 A1* | 12/2015 | Reich | G06Q 10/02 |
| | | | 705/5 |
| 2016/0330501 A1* | 11/2016 | Tomita | H04N 21/26283 |
| 2018/0088749 A1* | 3/2018 | Yamashita | G06Q 10/06311 |

FOREIGN PATENT DOCUMENTS

| | | |
|---|---|---|
| JP | 2014010818 | 1/2014 |
| KR | 1020140039194 | 4/2014 |
| KR | 1020170000382 | 1/2017 |
| KR | 1020170061634 | 6/2017 |
| KR | 1020170115648 | 10/2017 |

* cited by examiner

*Primary Examiner* — William C Trapanese
(74) *Attorney, Agent, or Firm* — Fish & Richardson P.C.

(57) ABSTRACT

A video display device includes a display unit outputting a timeline indicating a progress status of a predetermined task being executed, a communication unit requesting a vehicle providing service from an external server on the basis of a predetermined user input, and a controller controlling the display unit to display information regarding a service providing vehicle received in response to the request, on the timeline, wherein the service providing vehicle is selected in consideration of an end time of the predetermined task being executed.

20 Claims, 14 Drawing Sheets

FIG. 9
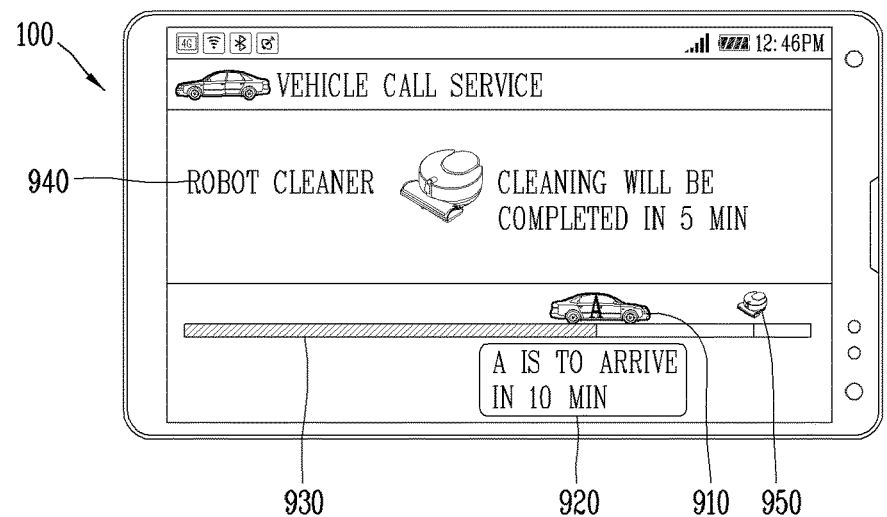
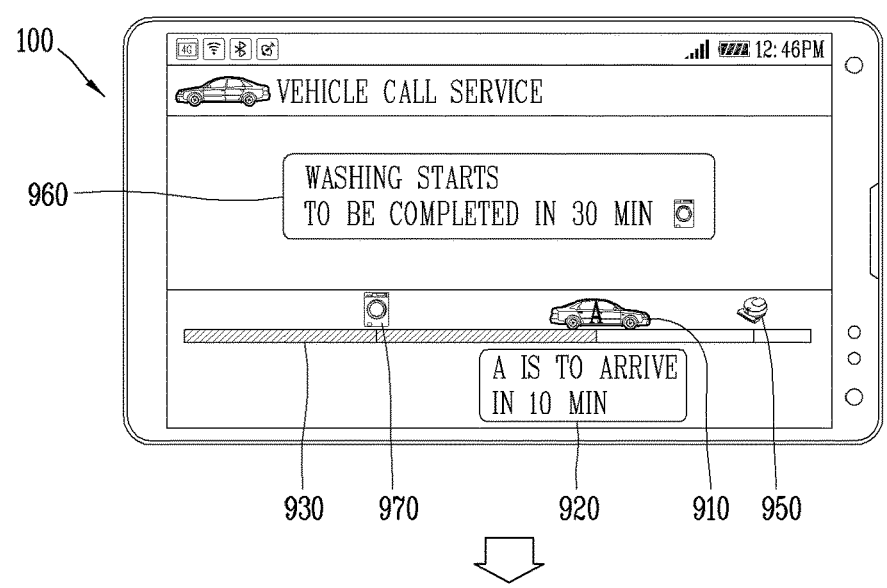
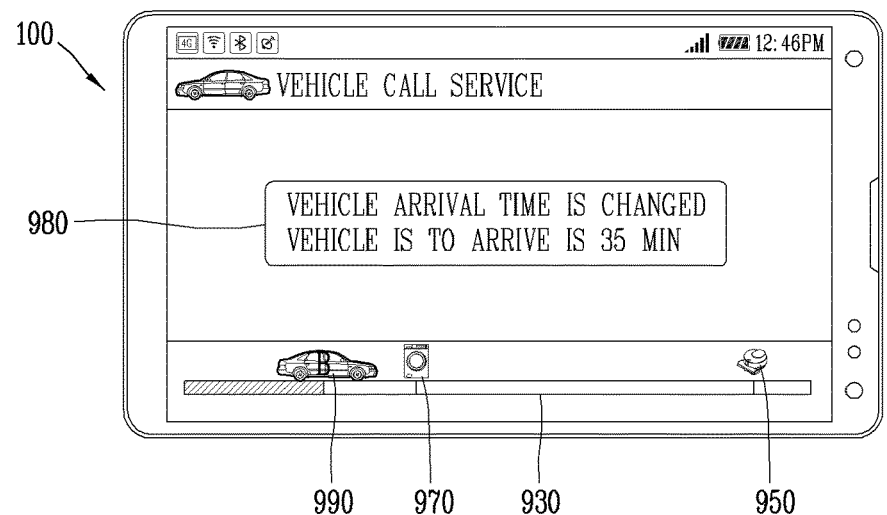

VIDEO DISPLAY DEVICE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2018-0027032, filed on Mar. 7, 2018, the contents of which are incorporated by reference herein in its entirety.

BACKGROUND OF THE INVENTION

1. Field of the Invention

The present disclosure relates to a video display device and a method for controlling the same.

2. Background of the Invention

Terminals, among video display devices, may be divided into a mobile terminal (mobile/portable terminal) and a stationary terminal according to whether the terminal may be moved. The mobile terminal may be divided into a handheld terminal and a vehicle mounted terminal according to whether the user may carry the mobile phone directly.

The functions of mobile terminals are diversified. For example, there are functions of data and voice communication, photographing and video shooting through a camera, voice recording, music file playback through a speaker system, and outputting an image or video to a display unit. Some terminals are equipped with an electronic game play function or a multimedia player function. In particular, modern mobile terminals may receive multicast signals that provide visual content such as broadcast, video or television programs.

As functions are diversified, terminals are implemented in the form of multimedia devices supporting composite functions such as photographing or video shooting, music or video file playback, playing games, receiving broadcast, and the like.

Meanwhile, when a vehicle providing service is requested using a mobile terminal, the user must designate a desired time point at which the user wants to get directly and reserve a vehicle, which is inconvenient. Also, a vehicle call and boarding service is not sufficient.

SUMMARY OF THE INVENTION

The present disclosure is directed to solving the above-mentioned problems and other problems. Another aspect of the present disclosure is to provide a video display device for calling a service providing vehicle in consideration of an end time of a predetermined task being executed in an external device, and a control method thereof.

To achieve these and other advantages and in accordance with the purpose of this specification, as embodied and broadly described herein, a video display device includes: a display unit outputting a timeline indicating a progress status of a predetermined task being executed; a communication unit requesting a vehicle providing service from an external server on the basis of a predetermined user input; and a controller controlling the display unit to display information regarding a service providing vehicle received in response to the request, on the timeline, wherein the service providing vehicle is selected in consideration of an end time of the predetermined task being executed.

In an embodiment, the predetermined task may include a predetermined task being executed in at least one of the video display device and an external device positioned within a predetermined distance from the video display device.

In another embodiment, the controller may control the display unit to display an icon corresponding to the service providing vehicle on the timeline, and a position where the icon is displayed on the timeline may be changed according to a remaining time for arrival of the service providing vehicle.

In another embodiment, the controller may control the communication unit to transmit a request for changing a scheduled arrival time of the service providing vehicle to the external server according to a predetermined condition.

Here, the predetermined condition may include a case where a user input is applied to change the position where the icon is displayed on the timeline.

In another embodiment, the predetermined condition may include a case where the end time of the predetermined task being executed is changed to a predetermined extent or greater.

In another embodiment, the predetermined condition may include a case where a predetermined task is newly executed in the external device.

In another embodiment, when a plurality of service providable vehicles are selected in response to the request for the vehicle providing service, the controller may control the display unit to display a plurality of icons respectively corresponding to the plurality of vehicles on the timeline.

Here, the service providing vehicle may be a vehicle corresponding to an icon selected by a user input, among the plurality of icons.

In another embodiment, when the predetermined task being executed is in plurality, the controller may control the display unit to display a progress status of the plurality of predetermined tasks on the timeline.

Here, the service providing vehicle may be selected in consideration an end time of at least one of the plurality of predetermined tasks.

In a specific example, the service providing vehicle may be selected on the basis of a latest time among end times of the plurality of predetermined tasks.

Also, in another embodiment, when the scheduled arrival time of the service providing vehicle is changed to the predetermined extent or greater, the controller may control the display unit to display notification information indicating the change.

Also, in another embodiment, the controller may generate a control signal for controlling the end time of the predetermined task being performed, on the basis of the changed scheduled arrival time.

In a specific example, the controller may generate a control signal for terminating execution of the predetermined task within the changed scheduled arrival time.

Also, in another embodiment, when content is being played in the video display device, the controller may control the display unit to display information regarding a service providing vehicle selected in consideration of an end time of the content, on the timeline.

Also, in another embodiment, when the scheduled arrival time of the service providing vehicle is changed to a predetermined extent or greater, the controller may generate a control signal for changing a playback speed of the content such that playback of the content may be terminated within the changed scheduled arrival time.

To achieve these and other advantages and in accordance with the purpose of this specification, as embodied and broadly described herein, a method for controlling a video display device includes: outputting a timeline indicating a progress status of a predetermined task being executed; requesting a vehicle providing service from an external server on the basis of a predetermined user input; and displaying information regarding a service providing vehicle received in response to the request, on the timeline, wherein the service providing vehicle is selected in consideration of an end time of the predetermined task being executed.

In an embodiment, the predetermined task may include a predetermined task being executed in at least one of the video display device and an external device positioned within a predetermined distance from the video display device.

Also, in another embodiment, the displaying of information regarding the service providing vehicle on the timeline may include: displaying an icon corresponding to the service providing vehicle on the timeline; and changing a position where the icon is displayed on the timeline according to a remaining time for arrival of the service providing vehicle.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 9 is a conceptual view for explaining an embodiment in which a scheduled arrival time of a service providing vehicle is changed as a new task is detected.

DETAILED DESCRIPTION OF THE INVENTION

Figure 1A:
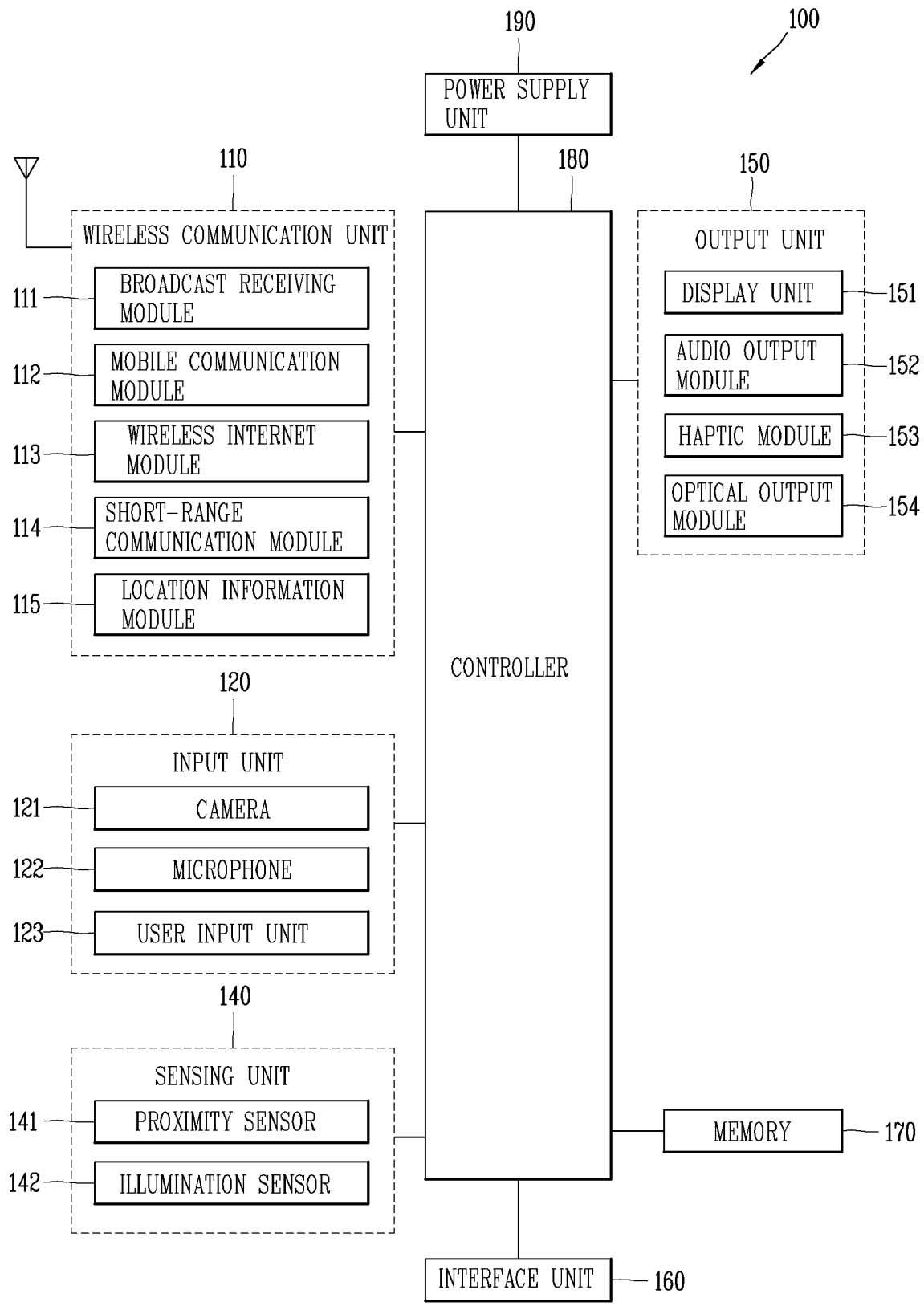
FIG. 1A is a block diagram illustrating a mobile terminal according to an embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A video display device according to the present disclosure may include a mobile terminal. Hereinafter, a mobile terminal related to the video display device will be described in detail.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
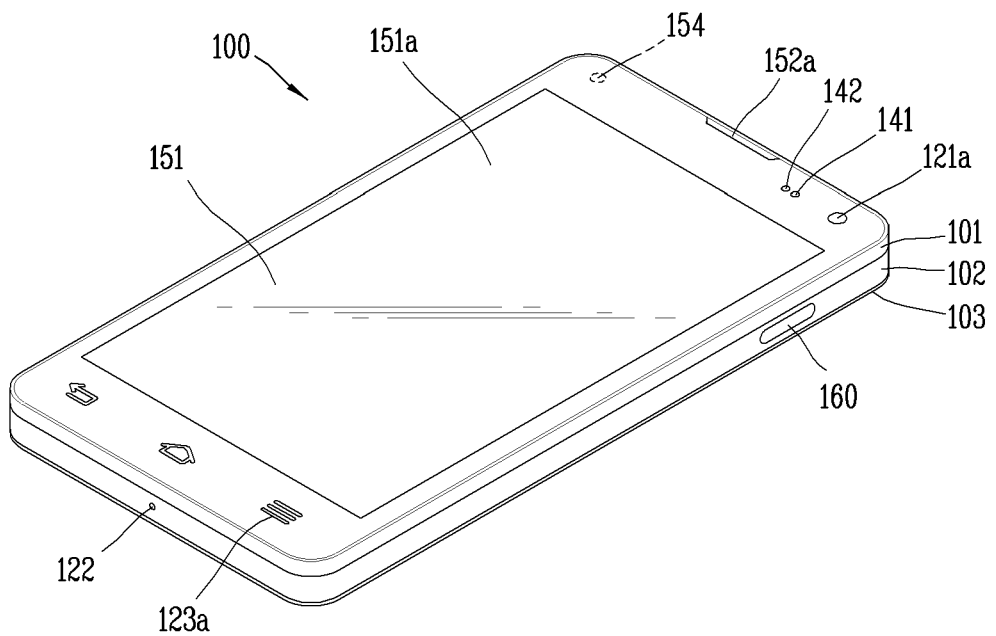
FIGS. 1B and 1C are conceptual views of a mobile terminal according to an embodiment of the present disclosure, viewed in different directions.
Figure 1C:
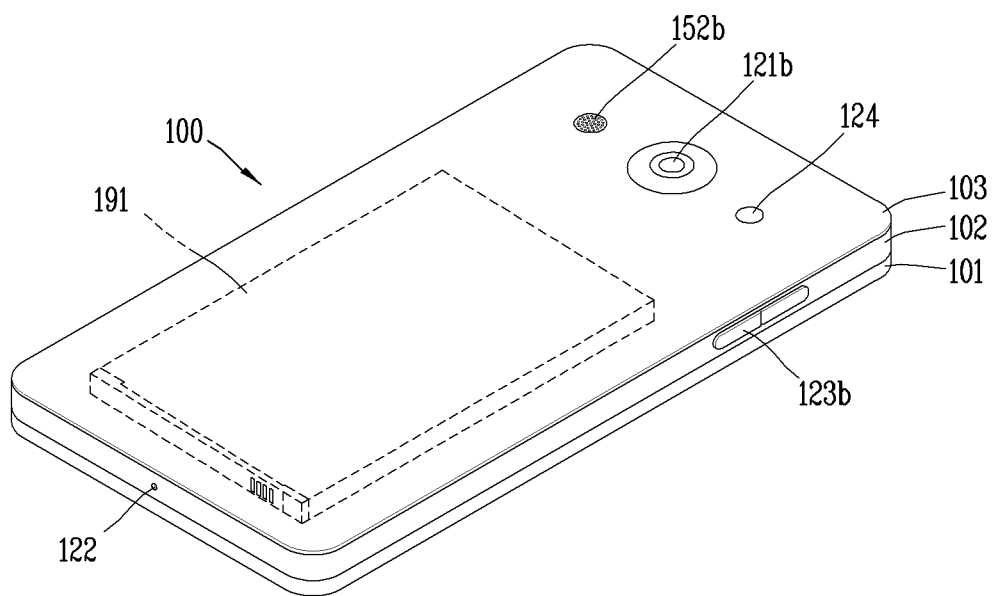

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
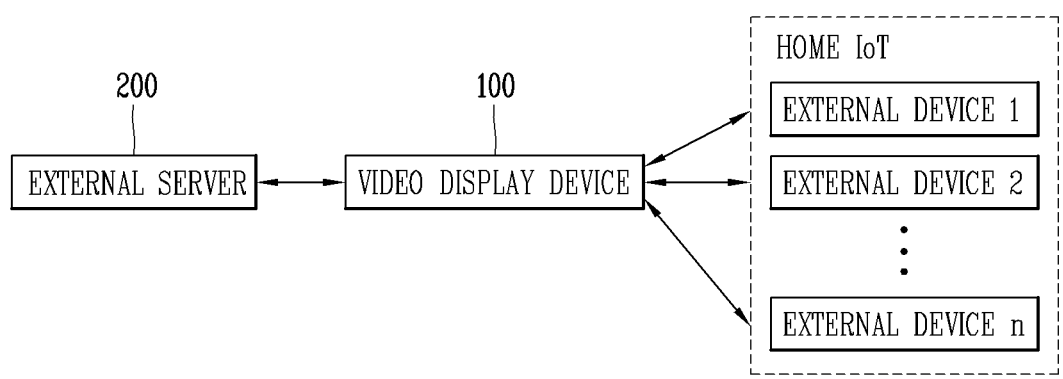
FIG. 2 is a block diagram for explaining a relation between a video display device and an external server according to the present disclosure.

FIG. 2 is a block diagram for explaining a relation between a video display device and an external server according to the present disclosure.

Referring to FIG. 2, a video display device 100 according to the present disclosure may communicate with an external server 200 and at least one external device.

The video display device 100 and the external device according to the present disclosure may be the mobile terminal described above or may be various Internet of Things (IOT) devices such as a TV, a washing machine, an air-conditioner, a cooking appliance, an air-purifier, a robot cleaner, and the like.

In the video display device 100 or an external device, a predetermined task may be performed. The predetermined task may be defined as a task that takes a time to perform.

For example, when the video display device 100 is a smart TV, playing content may be defined as performing a predetermined task.

In another example, the video display device 100 and the external device may exist within a predetermined distance. In a specific example, the video display device 100 and the external device may be home IoT devices located together in a predetermined space.

The external server 200 may be defined as a management server for performing a vehicle providing service. Thus, when the video display device 100 requests the vehicle providing service from the external server 200, the external server 200 may transmit information of an available service providing vehicle to the video display device 100.

To this end, the external server 200 may select the service providing vehicle in consideration of a position of the video display device 100, a type of a task being performed by the video display device 100 or an external device, an end time of the task, and the like, in a predetermined registered vehicle.

In a specific example, the service providing vehicle may be a vehicle providing a boarding service or a delivery service, and may arrive at the position of the video display device 100 after a task being executed is terminated.

Information of the service providing vehicle received in response to the request for the vehicle providing service may be output from at least one of the video display device 100 and the external device.

In an embodiment, the information of the service providing vehicle may be output from an external device near the user or a predetermined external device. In another example, the information of the service providing vehicle may be output from an external device currently executing a predetermined task. If a plurality of external devices are performing a task, the information of the service providing vehicle may be output from a predetermined external device with priority.

Here, the information of the service providing vehicle may be displayed together on a timeline indicating the progress of the predetermined task being executed. The timeline may be displayed on the video display device 100 or an external device.

In a specific example, when the video display device 100 is a smart TV, an icon corresponding to the service providing vehicle may be displayed on a timeline for displaying a playback status (playback time) of content. Here, the timeline may be output on a display unit of the video display device 100.

In another example, when the external device is a robot cleaner, an icon corresponding to a service providing vehicle may be displayed on a timeline indicating the progress of cleaning (time to complete cleaning, or the like). Here, the timeline may be output on the display unit of the video display device 100. Alternatively, it may be output on a display unit of the smart cleaner.

The icon corresponding to the service providing vehicle may be displayed on a timeline at a position considering a scheduled arrival time of the service providing vehicle.

For example, the displayed position may be determined in consideration of the progress of the currently executed task, a remaining time (remaining time for arrival) for the service providing vehicle to arrive, a scheduled arrival time, and a completion time of the task. That is, the icon may be moved as the service providing vehicle moves (as the remaining time until arrival decreases).

In another example, when the video display device 100 is a mobile terminal, the video display device 100 may operate as a relay device connecting the home IoT device and an external server.

Specifically, when the vehicle providing service is called using the mobile terminal, a washing machine and a cooking appliance, which are IoT devices around the mobile terminal, may be in operation. Thus, the mobile terminal may transmit a washing completion time and a cooking completion time to the external server 200, and the external server 200 may select the service providing vehicle in consideration of the washing and cooking completion time.

The information of the selected service providing vehicle may be transmitted to the mobile terminal. In an embodiment, a timeline indicating the progress and completion time of the laundry, the progress and completion time of the cooking, the scheduled arrival time of the service providing vehicle, and the remaining time until arrival, and the like, may be output on the mobile terminal. Such a timeline may also be output in a washing machine and a cooking appliance.

Figure 3:
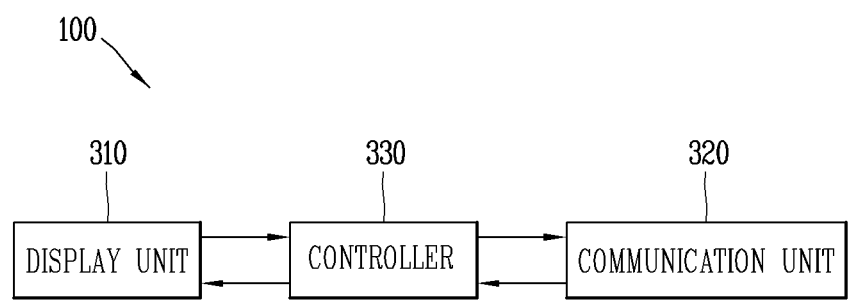
FIG. 3 is a block diagram for explaining an embodiment of a video display device according to the present disclosure.

FIG. 3 is a block diagram for explaining an embodiment of a video display device according to the present disclosure.

Referring to FIG. 3, the video display device 100 according to the present disclosure may include a display unit 310, a communication unit 320, and a controller 330.

The display unit 310 may output a timeline indicating the progress of a predetermined task being executed.

For example, a timeline indicating a playback status of the content, that is, a playback time, a playback completion time, etc., may be output.

Here, the predetermined task may include a predetermined task being executed in at least one of the video display device 100 and an external device located within a predetermined distance from the video display device 100.

The communication unit 320 may request the vehicle providing service from the external server 200 on the basis of a predetermined user input.

In an embodiment, the vehicle providing service may be requested from the external server 200 by applying a touch input to an icon of an application for requesting the vehicle providing service. Alternatively, the vehicle providing service may be requested using voice recognition.

In another example, when the video display device 100 is a TV, an application for requesting the vehicle providing service may be executed using a remote controller.

The controller 330 may control the display unit 310 to display information on the service providing vehicle received in response to the request on the timeline.

Here, the service providing vehicle may be selected in consideration of an end time of the predetermined task being executed.

In a related embodiment, a vehicle which may arrive at a time obtained by adding a predetermined preparation time to the end time of the predetermined task may be selected. To this end, the user may apply a long touch input on the timeline or a touch input to extend the timeline. Accordingly, a time to be considered when selecting a service vehicle may be set.

Hereinafter, a specific embodiment will be described with reference to the drawings.

The controller 330 may control the display unit 310 to display an icon corresponding to the service providing vehicle on the timeline, and the position of the icon displayed on the timeline may be changed according to a remaining time for the vehicle to arrive.

Figure 4:
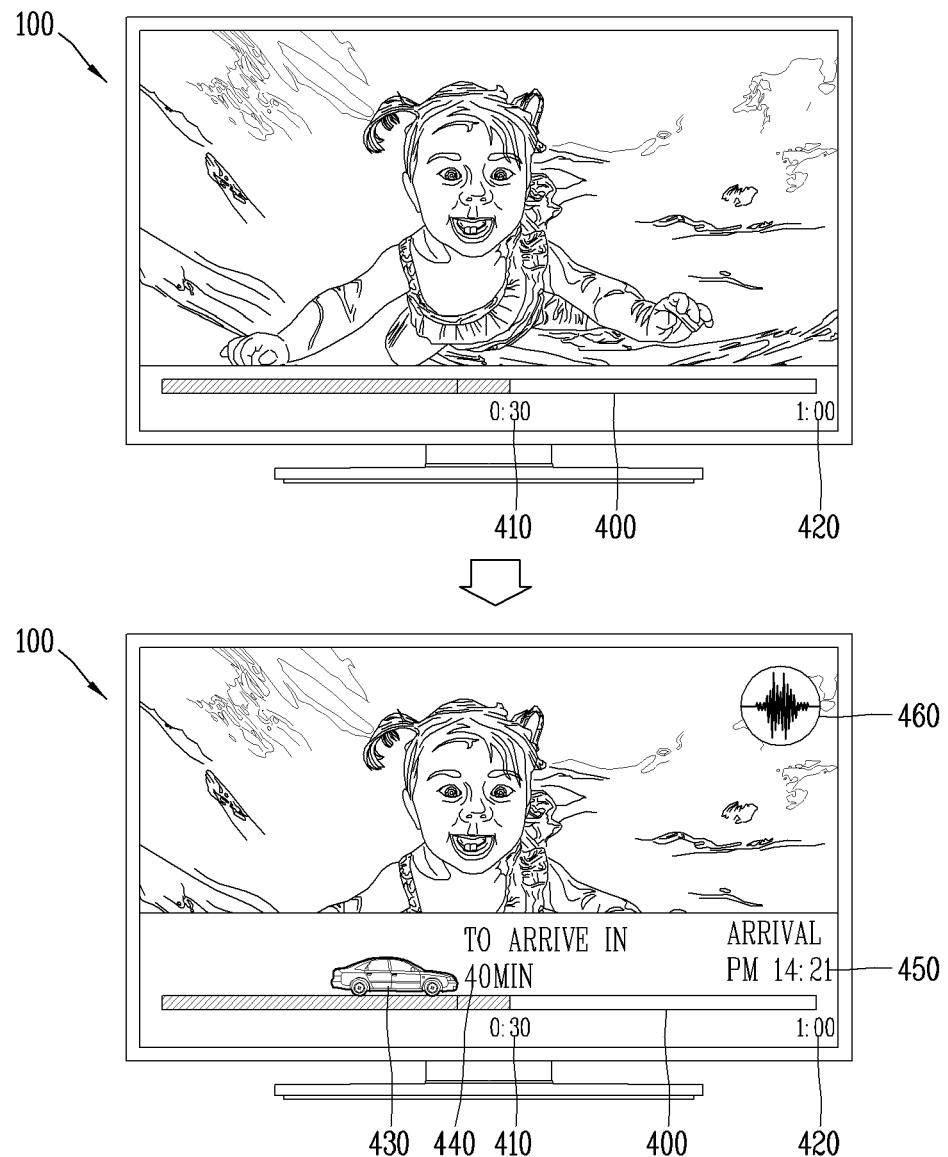
FIG. 4 is a conceptual view for explaining an embodiment in which an icon of a service providing vehicle is displayed on a timeline.

FIG. 4 is a conceptual view for explaining an embodiment in which an icon of the service providing vehicle is displayed on the timeline.

Referring to FIG. 4, when the content is being played in the video display device 100, a timeline 400 for displaying a playback status may be output. For example, the timeline 400 may have a total playback time of the currently played content as a total size value (size of a timeline bar). Accordingly, a total playback time 420 of the content and a playback progress time 410 may be displayed on the timeline 400.

Here, the user may execute a request for the vehicle providing service by voice recognition. In the case of executing a voice recognition function, an icon 460 indicating that voice recognition is being performed may be displayed on the screen.

For example, the user may request the vehicle providing service by a simple voice command such as "Taxi Call". Alternatively, the user may request the vehicle providing service by voice command for setting an arrival time or place, such as "Call a taxi to department store 10 minutes after movie ends".

As described above, in response to the request for vehicle providing service, the external server 200 may select a service providing vehicle. In an embodiment, the server 200 may select a vehicle which is available to arrive (come) after completion of the content, as a service providing vehicle and transmit corresponding information to the video display device 100.

As a result, an icon 430 corresponding to the selected service providing vehicle may be displayed on the timeline 400. In addition, a time 440 for the service providing vehicle to arrive (come) and a scheduled arrival time 450 may be displayed. Also, as the vehicle moves, the icon 430 may accordingly be moved to be displayed.

In another embodiment, the user may display (forward) an approval message for a recommended service providing vehicle by a voice command such as "OK" or "good".

If a plurality of vehicles capable of providing a service are selected in response to the request for the vehicle providing service, the controller 330 may control the display unit 330 to display a plurality of icons respectively corresponding to the plurality of vehicles on the timeline.

Here, a vehicle corresponding to an icon selected by a user input among the plurality of icons may be selected as the serving providing vehicle.

Figure 5:
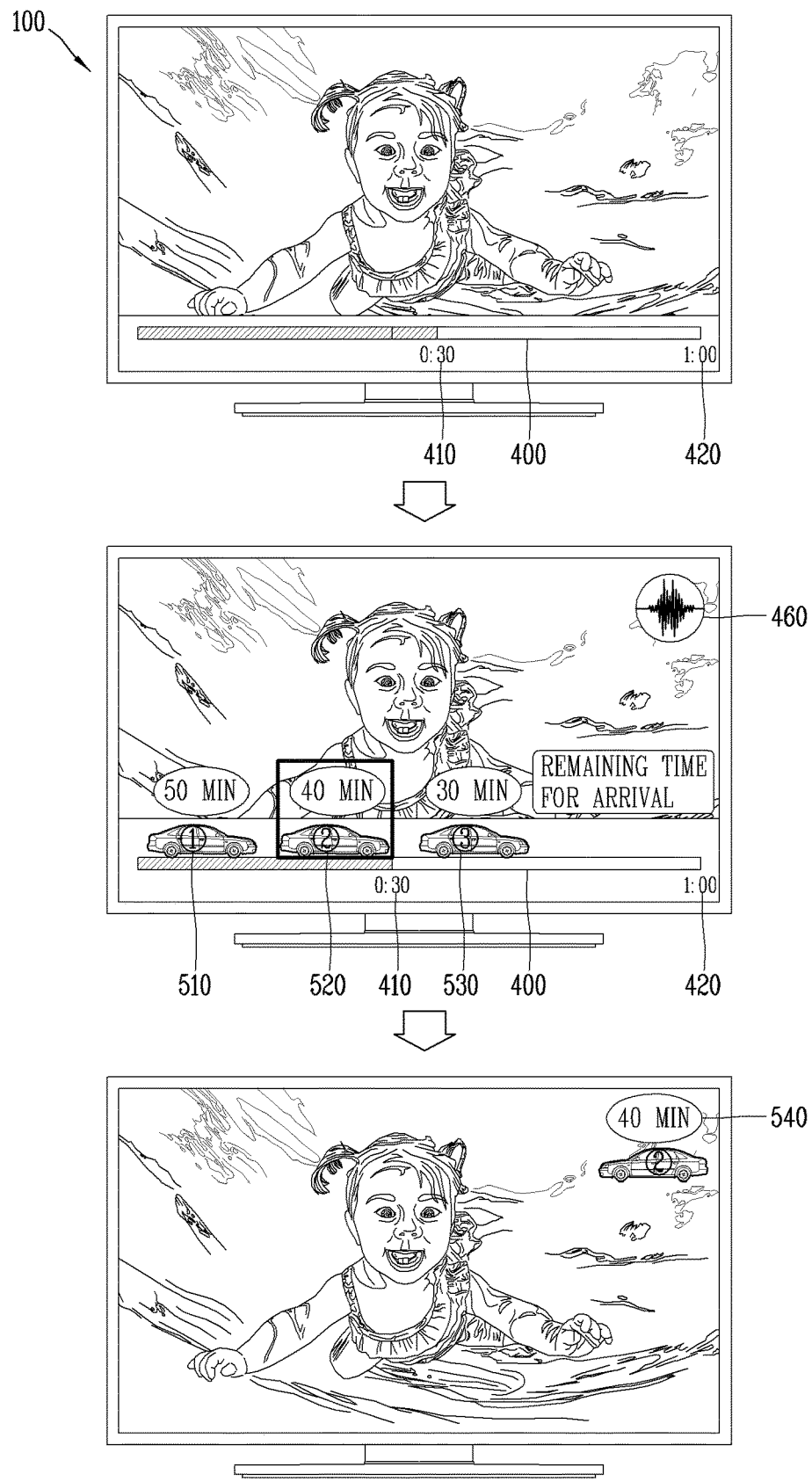
FIG. 5 is a conceptual view for explaining an embodiment in which a plurality of icons of service providing vehicles are displayed on the timeline.

FIG. 5 is a conceptual view for explaining an embodiment in which a plurality of icons of service providing vehicles are displayed on the timeline.

Referring to FIG. 5, as described in FIG. 4, when content is being played on the video display device 100, the timeline 400 for displaying a playback status may be output. Also, the total playback time 420 of the content and the playback progress time 410 may be displayed on the timeline 400.

Here, the user may execute a request for a vehicle providing service by voice recognition. In the case of executing the voice recognition function, the icon 460 indicating that voice recognition is being performed may be displayed on the screen.

As described above, in response to the request for the vehicle providing service, the external server 200 may select a service providing vehicle. In an embodiment, the external server 200 may select a vehicle capable of arriving after the end of the content, as the service providing vehicle, and transmit corresponding information to the video display device 100.

In this case, a plurality of vehicles capable of providing the service may be selected. For example, a plurality of vehicles that may arrive within a predetermined range based on a content end time may be selected as vehicles (service providable vehicles or candidate vehicles) capable of providing the service.

As a result, a plurality of icons 510, 520, and 530, respectively corresponding to the plurality of service providable vehicles, may be displayed on the timeline 400, respectively. Here, a time (remaining time for arrival) required for each vehicle to arrive may be displayed together.

In addition, each of the icons 510, 520, and 530 may be displayed at different positions according to the remaining time for arrival. For example, the icon 530 of the vehicle which may arrive the earliest may be displayed on the far right.

Then, the user may select one of the plurality of icons 510, 520, and 530 to select a vehicle to be provided for the service.

In an embodiment, in case where the video display device 100 is the mobile terminal 100, a corresponding vehicle may be selected by applying a touch input to one icon 520.

In another example, when the video display device 100 is a TV, one icon 520 may be selected using a voice command or a remote control.

When the icon 520 is selected, an indicator indicating the icon 520, for example, a frame surrounding the icon 520, may be displayed. Alternatively, similarly to FIG. 4, only the icon 520 corresponding to the selected vehicle may be output.

In another example, the output of the timeline 400 is terminated, and an object 540 indicating the selected vehicle and the remaining time for arrival may be output to one area of the screen.

Meanwhile, the controller 330 may control the communication unit 820 to transmit a request for changing a scheduled arrival time of the service providing vehicle to the external server 200 according to a predetermined condition.

Here, the predetermined condition may include a case where a user input is applied to change the position where the icon is displayed on the timeline.

Figure 6:
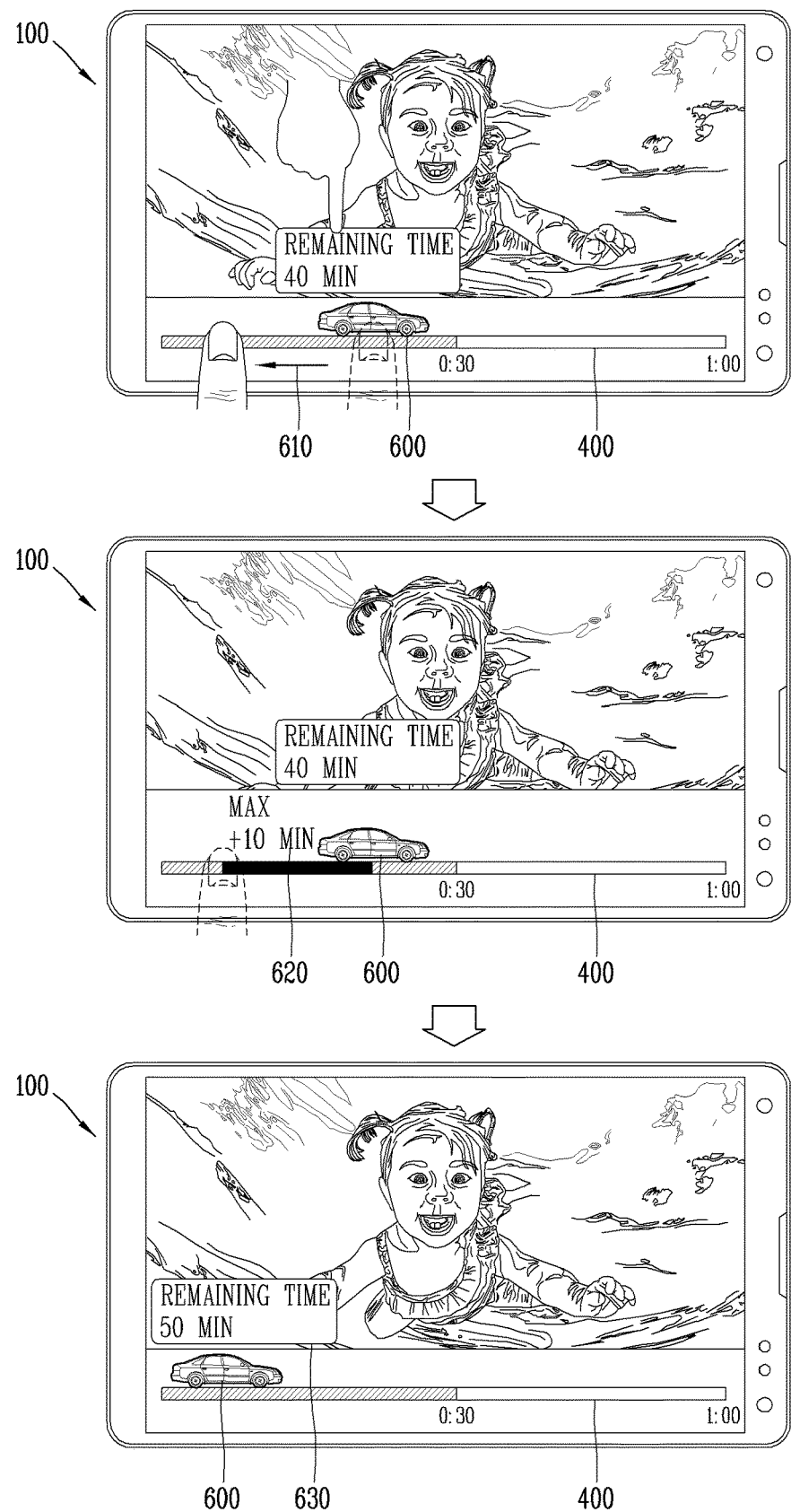
FIGS. 6 and 7 are conceptual views for explaining an embodiment in which a scheduled arrival time of a service providing vehicle is changed by applying a touch input to an icon of the service providing vehicle.
Figure 7:
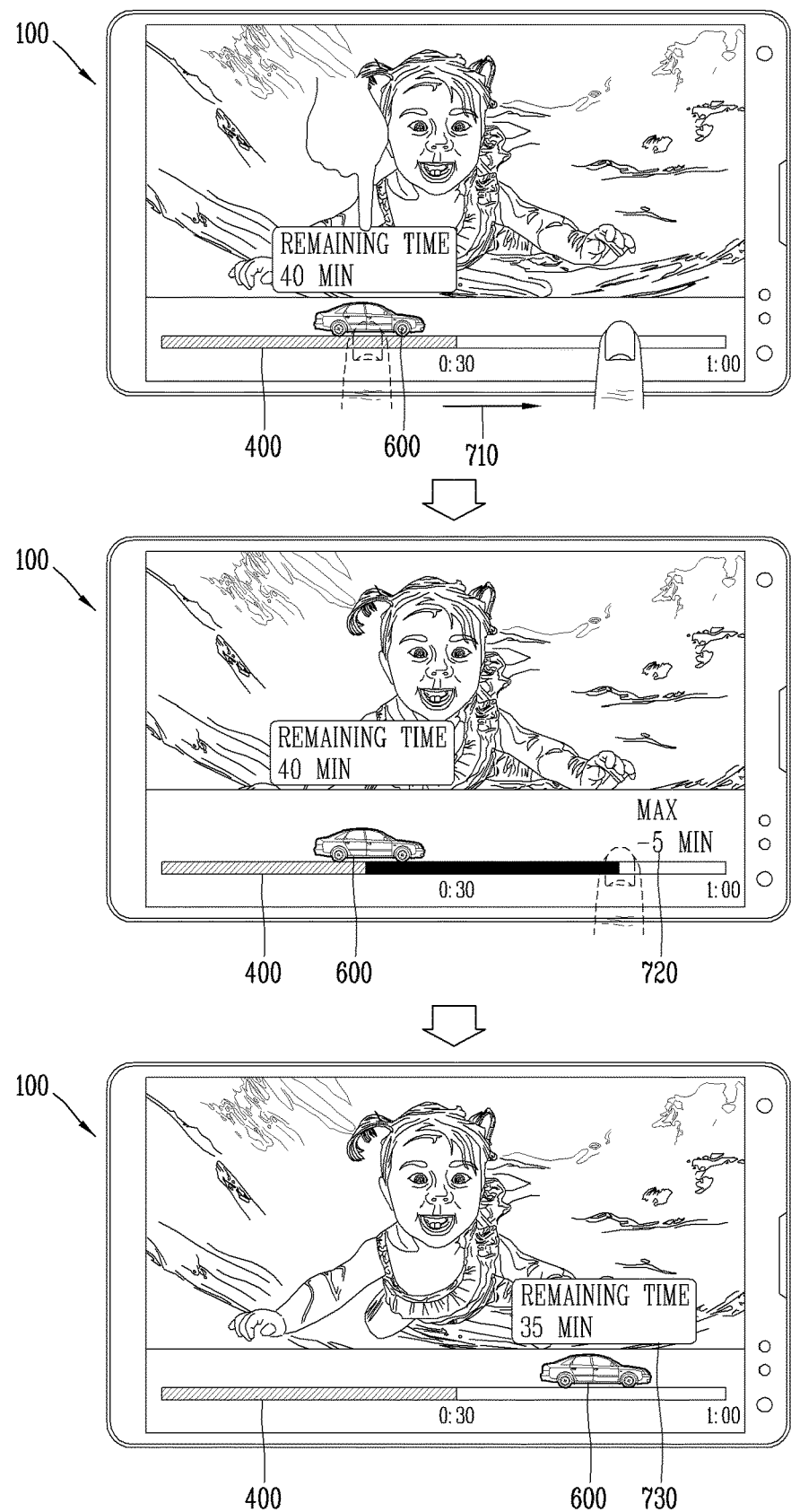

FIGS. 6 and 7 are conceptual views for explaining an embodiment in which a scheduled arrival time of a service providing vehicle is changed by applying a touch input to an icon of the serving providing vehicle.

Referring to FIG. 6, an icon 600 of a service providing vehicle and a remaining time for arrival may be displayed on the timeline 400, as described above.

In an embodiment, in case where the video display device 100 is a mobile terminal, a leftward drag or swipe input 610 may be applied to the icon 600. FIG. In another example, in case where the video display device 100 is a TV, the icon 600 may be moved to the left by a voice command or a remote control operation.

Accordingly, a scheduled arrival time of the service providing vehicle may be delayed. Specifically, a maximum delay time 620 with the service providing vehicle may be displayed at a point where the user input 610 is terminated.

In another example, a time desired to be delayed may be set according to distances over which the drag or swipe input 610 is applied. Specifically, as a distance to which the drag or swipe input is applied is increased, the time desired to be delayed may be set to be longer. In addition, a delayable time corresponding to a distance may be displayed on the timeline 400 according to distances over which the drag or swipe input 610 is applied.

As the scheduled arrival time is delayed, the increased arrival time 630 may be displayed. Also, the icon 600 may be shifted to the left in proportion to the increased remaining time 630 for arrival and output.

In another embodiment, when the service providing vehicle cannot arrive at the requested scheduled arrival time, a new service vehicle may be recommended (selected). For example, if the currently selected service providing vehicle cannot arrive 10 minutes later (increased scheduled arrival time), a new service providing vehicle that may arrive at the delayed scheduled arrival time may be recommended.

In another example, referring to FIG. 7, the icon 600 of the service providing vehicle and the remaining time for arrival may be displayed on the timeline 400, as described above.

In an embodiment, when the video display device 100 is a mobile terminal, a drag or swipe input 710 may be applied to the icon 600 in a rightward direction. In another example, when the video display device 100 is a TV, the icon 600 may be moved to the right by a voice command or a remote control operation.

Thus, the scheduled arrival time of the service providing vehicle may be advanced. Specifically, a maximum time 720 that may be advanced with the service providing vehicle may be displayed at a point where the user input 710 has ended.

In another example, a time desired to be advanced may be set according to distances over which the drag or swipe input 710 is applied. Specifically, as distance over which the drag or swipe input is applied is longer, the time to be advanced may be set to be longer. In addition, according to distances over which the drag or swipe input 710 is applied, a time available to be advanced corresponding to the distance may be displayed on the timeline 400.

As the scheduled arrival time is advanced in this way, a reduced remaining time 730 for arrival may be displayed. Also, the icon 600 may be shifted to the right in proportion to the reduced remaining time 730 for arrival and output.

In another embodiment, when the service providing vehicle cannot arrive at the requested schedule arrival time, a new service vehicle may be recommended (selected). For example, if the currently selected service providing vehicle cannot arrive 5 minutes earlier (the advanced scheduled arrival time), a new service providing vehicle that may arrive at the advanced scheduled arrival time may be recommended.

Meanwhile, the predetermined condition may include a case where the end time of the predetermined task being executed is changed to a predetermined extent or greater.

That is, when the end time of a predetermined task is delayed or advanced, the scheduled arrival time of the service providing vehicle may also be adjusted. If it is difficult for the currently recommended service providing vehicle to arrive at the scheduled arrival time desired to be changed, a new service providing vehicle may be recommended (selected).

Figure 8:
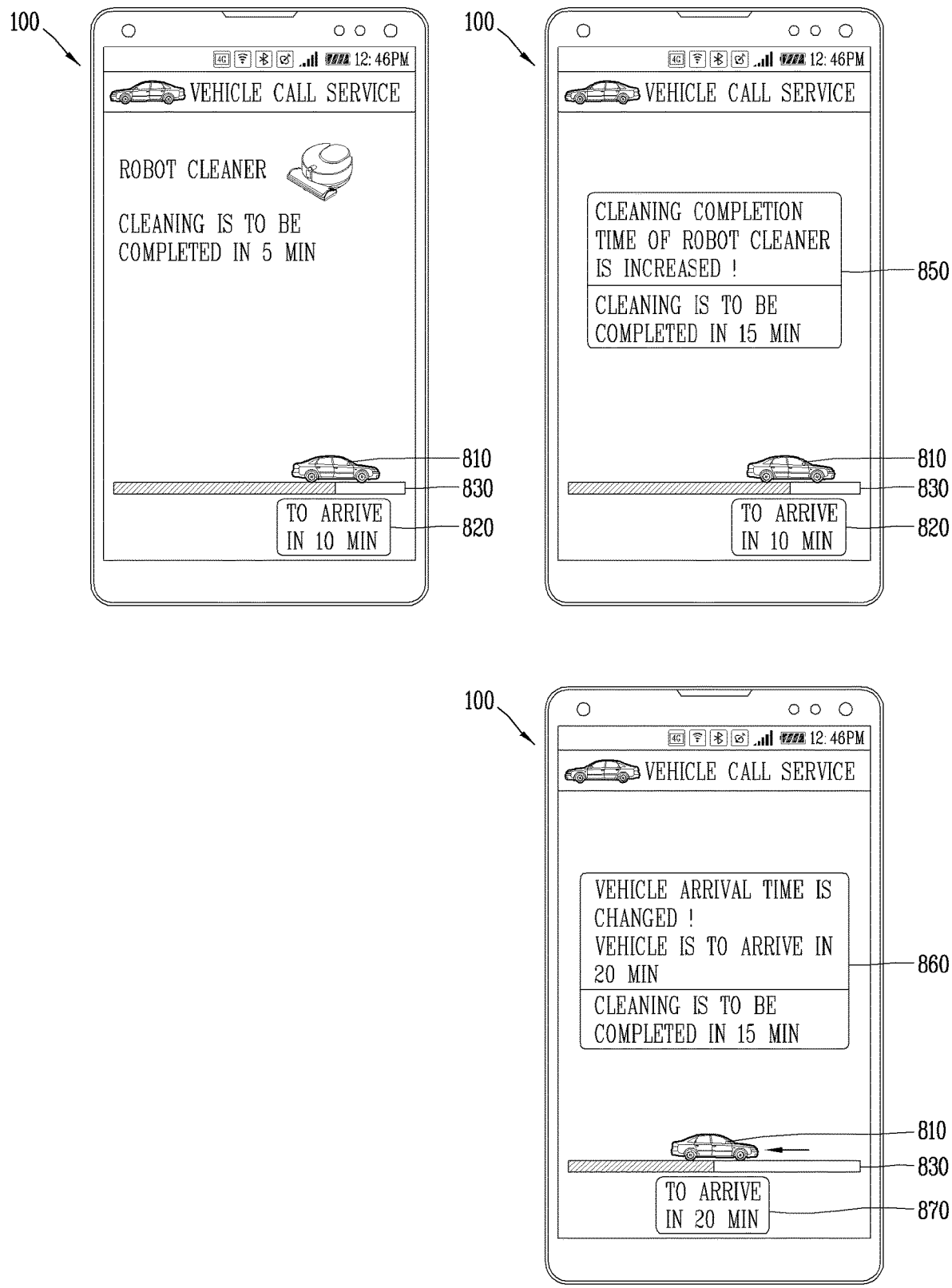
FIG. 8 is a conceptual view for explaining an embodiment in which a scheduled arrival time of a service providing vehicle is changed when a completion time of a predetermined task is changed.

FIG. 8 is a conceptual view for explaining an embodiment in which a scheduled arrival time of a service providing vehicle is changed when a completion time of a predetermined task is changed.

Referring to FIG. 8, the mobile terminal 100 may request a vehicle providing service. For example, a vehicle providing service application may be executed. Accordingly, a timeline 830 for displaying an icon 810 corresponding to the service providing vehicle and a remaining time 820 for arrival may be output.

As described above, in case where a predetermined task is being performed in a IoT device existing within a predetermined distance from the mobile terminal 100, the service providing vehicle may be selected in consideration of an end time of the predetermined task.

For example, in case where a robot cleaner is operating near the mobile terminal 100, a vehicle which may arrive after a cleaning completion time may be selected as the service providing vehicle.

In addition, a type of IoT device existing within the predetermined distance, the task being performed, and a task end time 840 may be output. For example, a cleaning completion time 840 of the robot cleaner may be output.

In another embodiment, when the end time of the predetermined task is changed to a predetermined extent or greater, notification information indicating the change may be output. If the cleaning completion time of the robot cleaner is delayed by more than 10 minutes, notification information 850 indicating the delay may be output.

Accordingly, the scheduled arrival time of the service providing vehicle may be changed. According to an embodiment, as the cleaning completion time of the robot cleaner is delayed by 10 minutes, the scheduled arrival time of the service providing vehicle may be delayed and notification information 860 indicating the delay may be output.

Then, the icon 810 may be shifted by the delayed time and displayed on the timeline 830, and a delayed scheduled arrival time 870 may be displayed.

Meanwhile, the predetermined condition may include a case where a predetermined task is newly performed in the external device.

That is, when another task being executed is newly detected, the scheduled arrival time of the service providing vehicle may be adjusted. If it is difficult for the currently recommended service providing vehicle to arrive at the scheduled arrival time to be changed, a new service providing vehicle may be recommended (selected).

FIG. 9 is a conceptual view for explaining an embodiment in which a scheduled arrival time of a service providing vehicle is changed as a new task is detected.

Referring to FIG. 9, when the mobile terminal 100 requests a vehicle providing service, a timeline 930 for displaying an icon 910 corresponding to the service providing vehicle and an remaining time 920 for arrival may be output.

As described above, in case where a predetermined task is being performed in an IoT device existing within a predetermined distance from the mobile terminal 100, the service providing vehicle may be selected in consideration of an end time of the predetermined task.

For example, when the robot cleaner is operating near the mobile terminal 100, a vehicle which may arrive (come) after a cleaning completion time may be selected as the service providing vehicle.

In addition, a type of the IoT device existing within the predetermined distance, the task being performed, and a task end time 940 may be output. For example, a cleaning completion time 940 of the robot cleaner, or the like, may be output.

In another example, an icon 950 corresponding to the robot cleaner may be displayed on the timeline 930.

Specifically, the timeline 930 may have a scheduled arrival time of the service providing vehicle as a whole section size. Accordingly, the icon 950 of the robot cleaner may be displayed in a section (position) corresponding to a time taken for the robot cleaner to perform cleaning in the whole section.

Here, in case where another task being executed is newly detected, the scheduled arrival time of the service providing vehicle may be adjusted.

For example, in case where a washing machine is operated near the mobile terminal 100, notification information 960 indicating that the washing machine starts to operate and a washing completion time may be output.

An icon 970 corresponding to the washing machine may be displayed on the timeline 930. Here, the icon 970 of the washing machine may be displayed in a section (position) corresponding to a time taken for washing in the whole section.

As the new task starts, the scheduled arrival time of the service providing vehicle may be changed. In an embodiment, in case where the washing is completed in 30 minutes, the arrival time of the vehicle may be delayed and notification information 980 indicating the delay may be output.

If the service providing vehicle may not arrive at the changed time, a new service providing vehicle that may arrive at the changed time may be recommended. Accordingly, an icon 990 corresponding to the changed vehicle may be displayed on the timeline 930.

Figure 10:
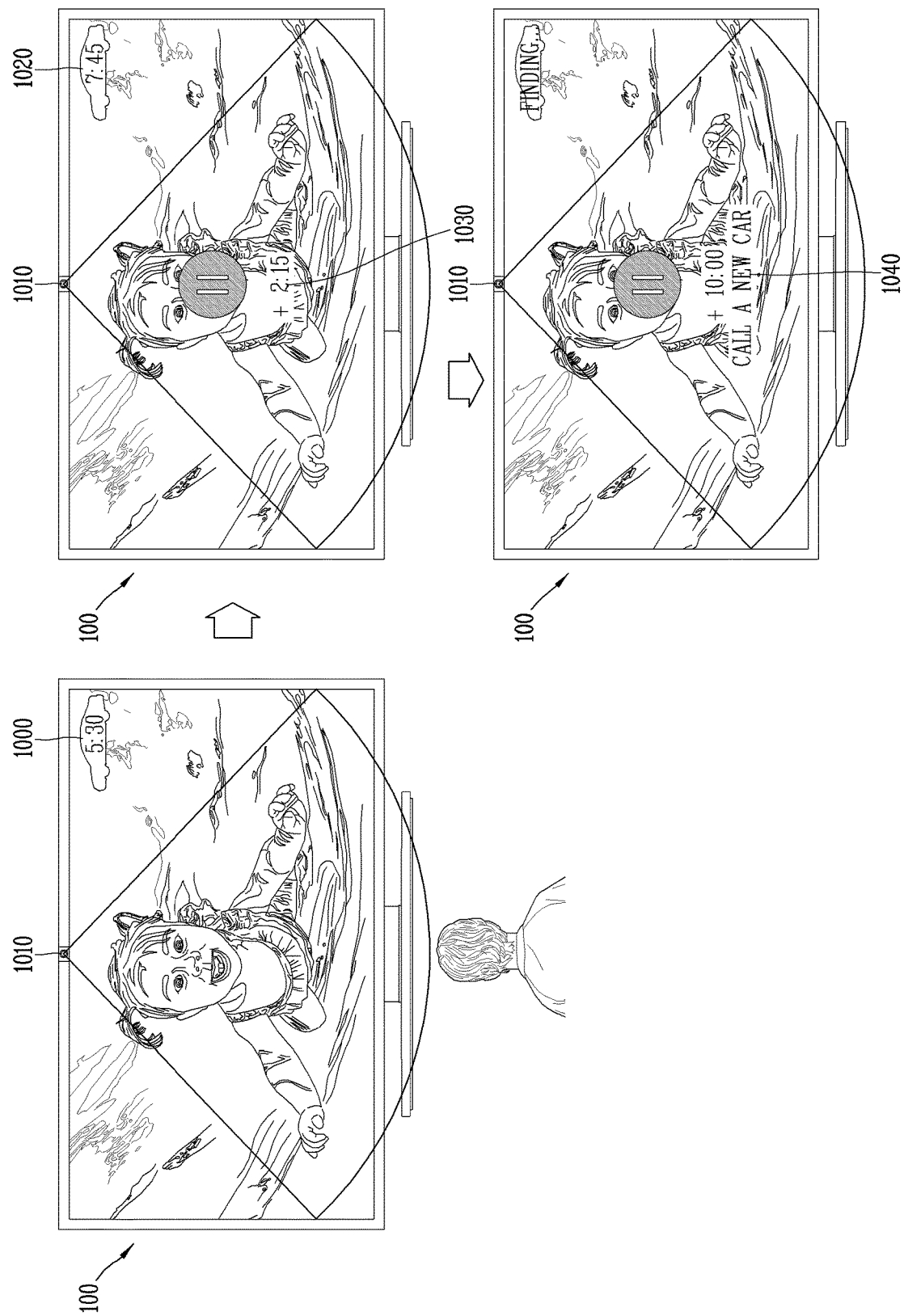
FIG. 10 is a conceptual view for explaining an embodiment in which a scheduled arrival time of a service providing vehicle is changed according to whether content is viewed.

FIG. 10 is a conceptual view for explaining an embodiment in which the scheduled arrival time of the service providing vehicle is changed according to whether the content is viewed.

Referring to FIG. 10, an icon 1000 indicating a remaining time for arrival of the service providing vehicle may be output on a region of the screen of the video display device 100, as described above.

Here, the video display device 100 may determine whether the user is viewing the content using various kinds of sensors, and adjust a vehicle call time (scheduled vehicle arrival time) accordingly.

For example, if a time during which the user does not view the content is lengthened by a predetermined period of time or longer, a call of the existing service vehicle may be canceled and a new vehicle may be called (selected). Alternatively, a scheduled arrival time of the existing service vehicle may be delayed.

In a specific example, the video display device 100 may detect the user's facial expression, the user's eyes, and the like, through a camera 1010. Further, the vehicle display device 100 may continuously or periodically determine whether the user is viewing the content by voice recognition.

As a result, if it is detected that the user does not look at the screen for a predetermined time or longer, the video display device 100 may delay the scheduled arrival time of the existing service vehicle by the predetermined time. Alternatively, when the user pauses playback by pressing a pause button, the scheduled vehicle arrival time may be delayed by the pause time.

Here, playback of the content may be stopped, and an icon 1020 indicating the extended scheduled arrival time may be output to an area of the screen of the video display device 100. Also, an extended time 1030 may be displayed with a pause icon.

In another embodiment, in case where playback of the content is stopped for a predetermined time or longer, a new service vehicle may be called and a guidance message 1040 indicating the same may be output.

Meanwhile, in case where a plurality of predetermined tasks are being executed, the controller 330 may control the display unit 310 to display a progress status of the plurality of tasks on the timeline.

Here, a service providing vehicle may be selected in consideration of an end time of at least one of the plurality of predetermined tasks.

In an embodiment, the service providing vehicle may be selected based on a latest time among end times of the plurality of predetermined tasks.

Figure 11:
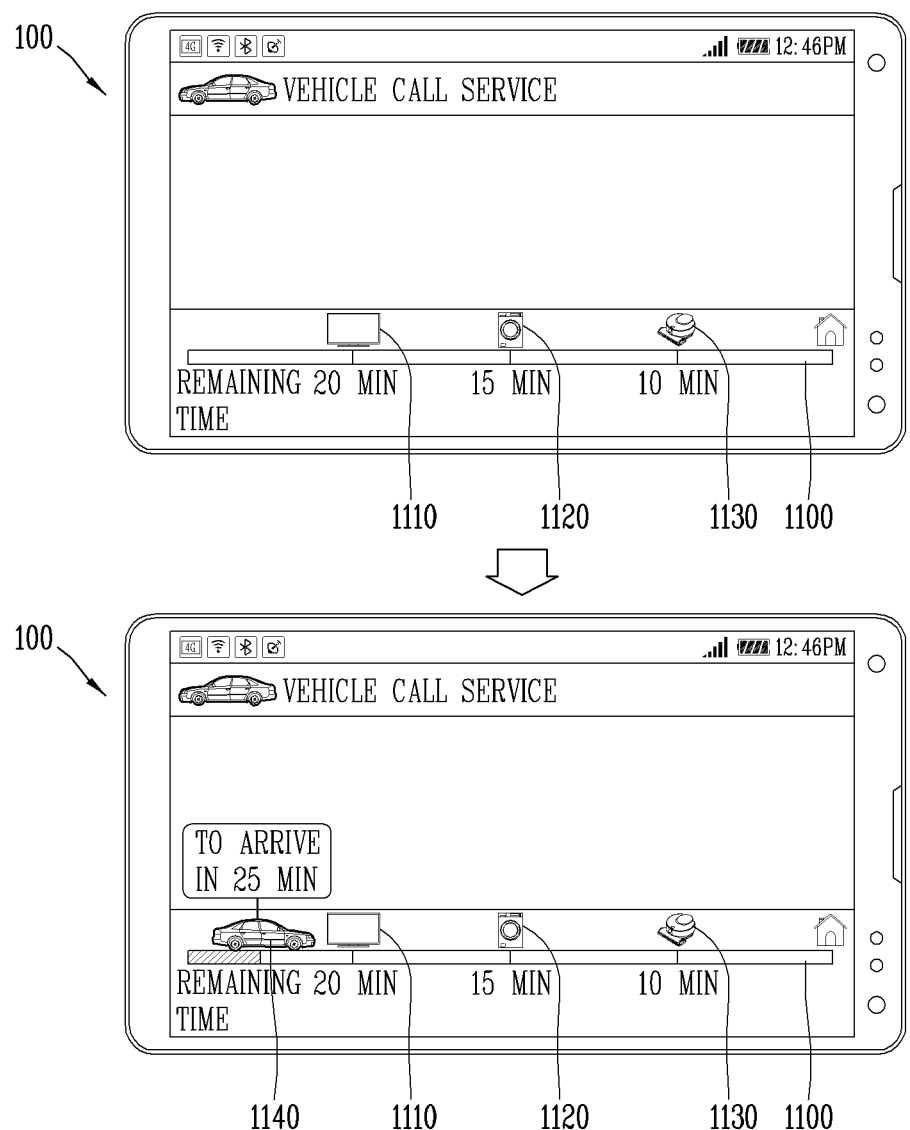
FIG. 11 is a conceptual view for explaining an embodiment in which a scheduled arrival time of a service providing vehicle is set in consideration of a plurality of tasks.

FIG. 11 is a conceptual view for explaining an embodiment in which a scheduled arrival time of a service providing vehicle is set in consideration of a plurality of tasks.

Referring to FIG. 11, in case where a predetermined task is being performed in each of a plurality of external devices, a progress status of each task may be displayed on the timeline.

In an embodiment, an icon 1110 of a TV and an end time of the content being output from the TV (time taken for the content to end) may be displayed on the timeline 1100. Similarly, an icon 1120 of a cooking appliance and a cooking completion time may be displayed, and an icon 1130 of a robot cleaner and a cleaning completion time may be displayed.

Here, the positions where the respective icons 1110, 1120, and 1130 are displayed on the timeline 1100 may be determined according to a time taken for a predetermined task to be completed.

For example, a total size of the timeline 1100 may represent 30 minutes. Thus, if the content ends in 20 minutes, the icon 1110 of the TV may be displayed at a position corresponding to 20 minutes in the entire timeline 1100 interval. Likewise, if cooking is completed in 15 minutes, the icon 1120 of the cooking appliance may be displayed at a position corresponding to 15 minutes in the entire timeline 1100 interval. In addition, if cleaning is completed in 10 minutes, the icon 1130 of the robot cleaner may be displayed at a position corresponding to 10 minutes in the entire timeline 1100 interval.

Meanwhile, as the vehicle providing service is requested, an icon 1140 of the service providing vehicle and a time taken for the vehicle to arrive may be displayed on the timeline 1100.

In an embodiment, in response to a request for a vehicle providing service, a vehicle that may arrive after all of a plurality of predetermined tasks are completed may be selected as a service providing vehicle.

In the embodiment, since it takes 20 minutes for completing the content, cooking, and cleaning, a vehicle which may arrive in 25 minutes may be selected as the service providing vehicle. Accordingly, an icon 1140 of the service providing vehicle may be displayed at a position corresponding to 25 minutes in the entire timeline 1100 interval.

FIG. 11 corresponds to an embodiment in which a service providing vehicle is selected when a plurality of tasks are executed. In a related example, the service providing vehicle may be selected in consideration of an end time of a task which is terminated at the earliest or a task having priority.

Alternatively, the user may directly set a scheduled arrival time of the service providing vehicle. For example, the scheduled arrival time of the service providing vehicle may be set to correspond to a point where the user applies a touch input on the timeline. Specifically, in case where a touch input is applied to a timeline point between the washing machine icon 1120 and the robot cleaner icon 1130 in FIG. 11, the service providing vehicle may arrive between 10 minutes and 15 minutes.

Meanwhile, when the scheduled arrival time of the service providing vehicle is changed to a predetermined extent or greater, the controller 330 may control the display unit 310 to display notification information indicating the change.

In an embodiment, the controller 330 may generate a control signal for controlling the end time of the predetermined task being performed, based on the changed scheduled arrival time.

In a specific example, the controller 330 may generate a control signal for terminating the execution of the predetermined task within the changed scheduled arrival time.

Figure 12:
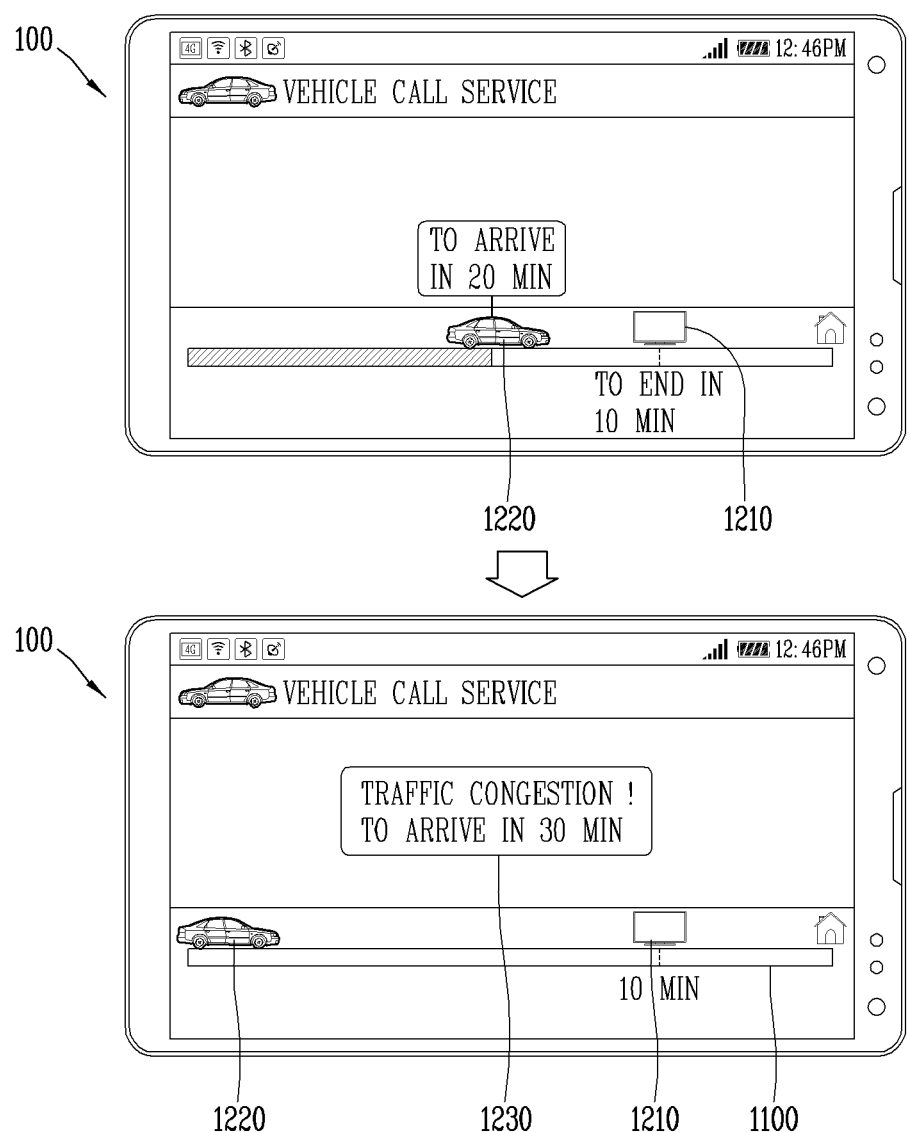
FIG. 12 is a conceptual view for explaining an embodiment in which a scheduled arrival time of a service providing vehicle is changed according to states of the service providing vehicle.

FIG. 12 is a conceptual view for explaining an embodiment in which scheduled arrival time of a service providing vehicle is changed according to the state of the service providing vehicle.

Referring to FIG. 12, as described above, a TV icon 1210, an end time of the content and an icon 1220 of a service providing vehicle and a time taken for the vehicle to arrive may be displayed on the timeline.

Here, in case where the scheduled arrival time of the service providing vehicle is changed to a predetermined extent or greater, notification information 1230 indicating the change may be output. For example, a reason (traffic congestion, occurrence of an accident, etc.) why the scheduled arrival time of the vehicle is changed, a changed scheduled arrival time, and the like, may be output.

Further, as the scheduled arrival time is changed, the position at which the icon 1220 of the service providing vehicle is displayed may also be changed. For example, the icon 1220 of the service providing vehicle may be shifted to the left by the increased time and output.

Figure 13:
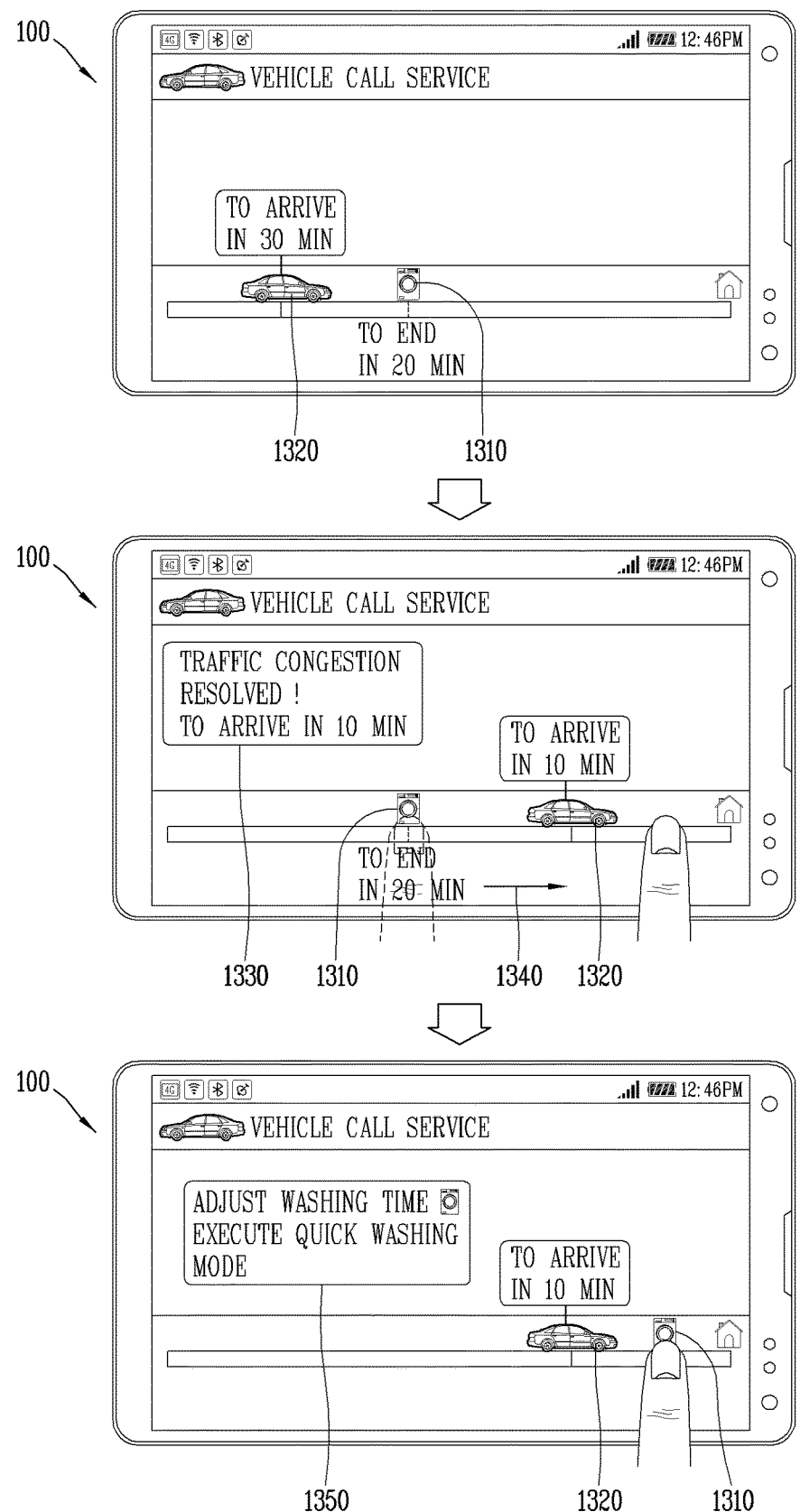
FIG. 13 is a conceptual view for explaining an embodiment in which a completion time of a predetermined task is changed when a scheduled arrival time of a service providing vehicle is changed.

FIG. 13 is a conceptual view for explaining an embodiment in which a completion time of a predetermined task is changed when a scheduled arrival time of a service providing vehicle is changed.

Referring to FIG. 13, as described above, a washing machine icon 1310, a washing end time (ending in 20 minutes) and an icon 1320 of the service providing vehicle and a time taken for the vehicle to arrive may be displayed on the timeline.

Here, in case where the scheduled arrival time of the service providing vehicle is changed to a predetermined extent or greater, notification information 1330 indicating the change may be output. For example, notification information 1330 indicating that traffic congestion is resolved and the service providing vehicle will arrive in 10 minutes may be output.

Also, as the scheduled arrival time is changed, the position at which the icon 1320 of the service providing vehicle is displayed may also be changed. For example, the icon 1320 of the service providing vehicle may be shifted to the right by the reduced time and output.

Accordingly, the user may adjust the execution time of the task by applying a predetermined input. In an embodiment, if a drag input 1340 to the light is applied to the washing machine icon 1310, the washing machine icon 1310 may be moved to the right and displayed. Also, a control signal for adjusting a washing time may be transmitted to the washing machine. In a specific example, in order to complete the operation of the washing machine within five minutes, a control signal for switching to a quick washing mode may be transmitted and notification information 1350 indicating the same may be output.

In this case, for example, various control signals may be transmitted according to types of the external device and types of the predetermined task. For example, a control signal for shortening a cleaning time of the robot cleaner, a control signal for adjusting a playback speed of the content (1.2 multiplication speed, etc.), a control signal for shortening a cooking time (increasing heating power), and the like, may be transmitted.

That is, according to the above-described embodiments, when the scheduled arrival time of the service providing vehicle is changed, the scheduled arrival time of the service providing vehicle may be changed or the execution completion time of the predetermined task may be adjusted.

Meanwhile, in case where the content is being played on the video display device, the controller 330 may control the display unit 310 to display information on the service providing vehicle selected in consideration of the end time of the content on the timeline.

In an embodiment, in case where the scheduled arrival time of the service providing vehicle is changed to a predetermined extent or greater, the controller 330 may generate a control signal for changing a playback speed of the content so that playing of the content is completed within the changed scheduled arrival time.

Figure 14:
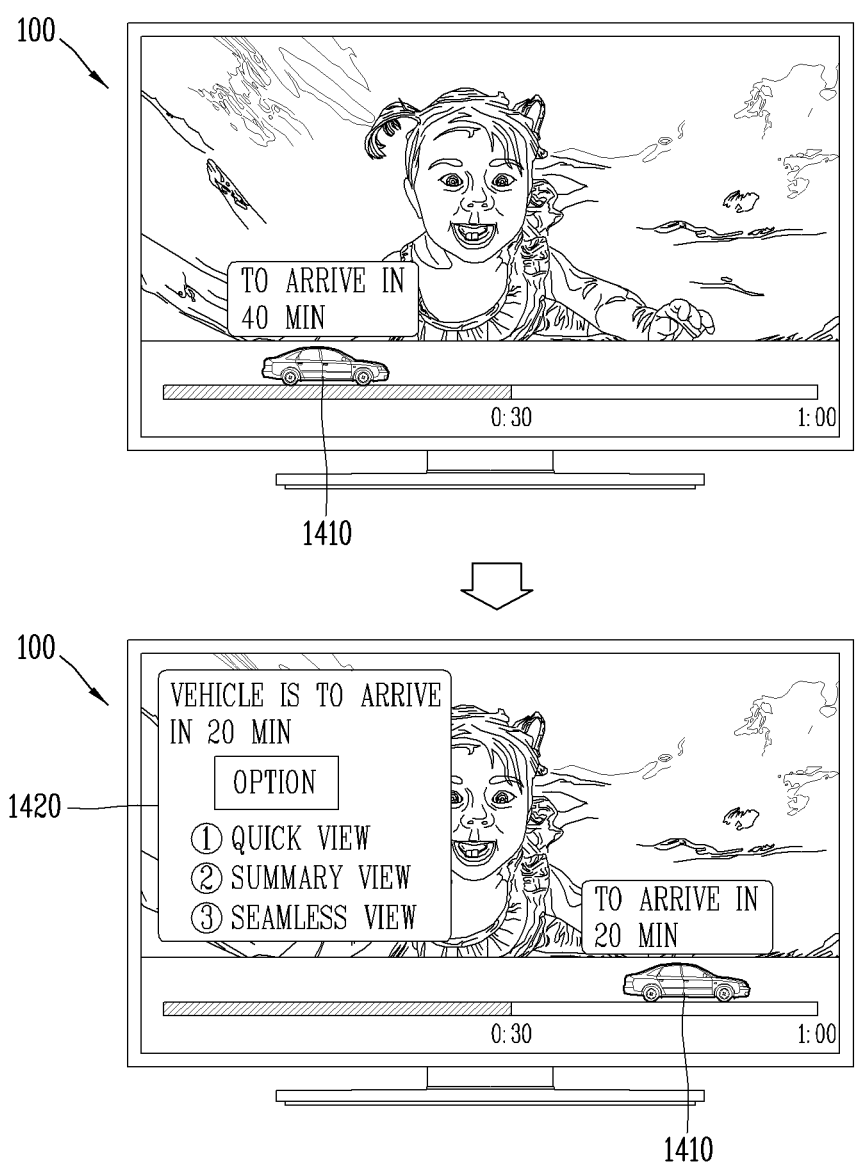
FIG. 14 is a conceptual view for explaining an embodiment of a selectable option when a scheduled arrival time of a service providing vehicle is changed during content playback (or reproduction).

FIG. 14 is a conceptual view for explaining an embodiment of a selectable option when a scheduled arrival time of a service providing vehicle is changed during content playback.

Referring to FIG. 14, a playback time of the content, an icon 1410 of the service providing vehicle, and a time required for the vehicle to arrive (will arrive in 40 minutes) may be displayed on the timeline, as described above.

In an embodiment, the service providing vehicle selected during the content playback may be a vehicle that may arrive at an end time of the content playback as possible.

Here, in case where the scheduled arrival time of the service providing vehicle is changed to a predetermined extent or greater, notification information 1420 indicating the change may be output. For example, notification information indicating that the service providing vehicle will arrive in 20 minutes may be output.

Further, as the scheduled arrival time is changed, the position at which the icon 1410 of the service providing vehicle is displayed may also be changed. For example, an icon 1410 of the service providing vehicle may be shifted to the right by the reduced time and output.

In another embodiment, as the scheduled arrival time of the service providing vehicle is reduced, a list of various selectable menus may be output.

In a specific example, a 'quick view (or fastforward)' menu may be output. In case where the corresponding menu is selected, a playback speed of the currently playing content is increased. Thus, for the 20 minutes taken for the service providing vehicle to arrive, a remaining portion of the content may be played at a high speed.

In another embodiment, a 'summary view' menu may be output. In case where the corresponding menu is selected, the content obtained by summarizing (editing) a portion of the viewed content, which has not been played yet, by important events may be played. That is, the summary or an important scene of the portion that has not yet been played may be played.

In another embodiment, an 'seamless view (or seamless playback)' menu may be output. In case where the corresponding menu is selected, the content may be stopped at the time when the service providing vehicle arrives. Subsequently, when the user gets on the service providing vehicle, the content may be played continuously from the stopped portion in the service providing vehicle or the terminal which is carried.

In another embodiment, when the vehicle providing service is requested while the content is viewed, the information of the service providing vehicle may be displayed at a time when the content is not disturbed (timing at which an image is disconnected). For example, the information of the service providing vehicle may be displayed at a time when an advertisement is seen while the user is viewing movie.

In another example, it is possible to select a time point at which the vehicle arrives during a time when viewing of the content is not disturbed. For example, an icon for selecting the arrival time may be displayed at each time when viewing of the content is not disturbed. When one of the icons is selected, a vehicle which may arrive at the corresponding time may be called.

Effects of the video display device and the method for controlling the same according to the present disclosure will be described.

According to at least one of the embodiments of the present disclosure, although an end time of a predetermined task being executed in a neighboring Home IoT device is not directly input, a service providing vehicle considering the end time may be called.

In addition, according to at least one of the embodiments of the present disclosure, a vehicle providing service considering reasons regarding the service providing vehicle such as traffic congestion, accident occurrence, or a change in a predetermined task end time may be provided.

Also, the information of the service providing vehicle may also be output even in a neighboring home IoT device, additional information may be received through the neighboring Home IoT device, or a control command related to vehicle call may be input.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A video display device comprising:
a display unit;
a communication unit;
at least one sensor;
at least one processor; and at least one computer memory that is operably connectable to the at least one processor and that has stored thereon instructions which, when executed, cause the at least one processor to perform operations comprising:
outputting, through the display unit, a timeline that indicates a progress status of a task being executed, the task comprising displaying a content on the display unit,
transmitting, through the communication unit to an external server and based on a user input, a request for a service providing vehicle,
controlling the display unit to display, on the timeline, information, received in response to the request, regarding at least one service providing vehicle selected based on an end time of the task being executed,
in a state in which the display unit displays the content, controlling the at least one sensor to sense whether a user views the content, and
based on the at least one sensor detecting that the user does not look at the display unit for a predetermined time or longer, controlling the communication unit to transmit a request for canceling the at least one service providing vehicle and to transmit a request for another service providing vehicle.

2. The video display device of claim 1, wherein the operations further comprise executing the task by at least one of the video display device or an external device that is located within a first distance from the video display device.

3. The video display device of claim 2, wherein the operations further comprise:
controlling the display unit to display, on the timeline, an icon corresponding to the at least one service providing vehicle that was selected based on the end time of the task being executed; and
controlling the display unit to change a position of the icon displayed on the timeline according to a remaining time for arrival of the at least one service providing vehicle.

4. The video display device of claim 3, wherein the operations further comprise:
based on at least one condition being satisfied, controlling the communication unit to transmit, to the external server, a request for changing a scheduled arrival time of the at least one service providing vehicle.

5. The video display device of claim 4, wherein the at least one condition being satisfied comprises a user input being received that indicates a change of the position of the icon displayed on the timeline.

6. The video display device of claim 4, wherein the at least one condition being satisfied comprises a change of the end time of the task by at least a threshold change amount.

7. The video display device of claim 4, wherein the task being executed is a first task, and
wherein at least one condition being satisfied comprises an execution of a second task by an external device located within a first distance from the video display device.

8. The video display device of claim 3, wherein the operations further comprise:
based on the at least one service providing vehicle comprising a plurality of service providing vehicles selected in response to the request for the service providing vehicle, controlling the display unit to display, on the timeline, a plurality of icons respectively corresponding to the plurality of service providing vehicles.

9. The video display device of claim 8, wherein the operations further comprise:
displaying one of the plurality of service providing vehicles that is determined based on a user selection of an icon among the plurality of icons.

10. The video display device of claim 8, wherein the task comprises a plurality of tasks being executed, and
wherein the operations further comprise:
controlling the display unit to display, on the timeline, a plurality of progress statuses respectively corresponding to the plurality of tasks.

11. The video display device of claim 10, wherein the operations further comprise:
controlling the display unit to display a first service providing vehicle, among the plurality of service providing vehicles, that is selected based on an end time of at least one of the plurality of tasks.

12. The video display device of claim 11, wherein the operations further comprise:
controlling the display unit to display the service providing vehicle that is selected based on a latest end time among a plurality of end times respectively corresponding to the plurality of tasks being executed.

13. The video display device of claim 4, wherein the operations further comprise:
based on the request for changing the scheduled arrival time of the at least one service providing vehicle, controlling the display unit to display notification information indicating a change of the scheduled arrival time.

14. The video display device of claim 13, wherein the operations further comprise:
generating a first control signal for controlling the end time of the task being executed based on the changed scheduled arrival time.

15. The video display device of claim 14, wherein the operations further comprise:
generating a second control signal for terminating execution of the task on or before the changed scheduled arrival time.

16. The video display device of claim 4,
wherein the operations further comprise:
in a state in which the video display device displays the content, controlling the display unit to display, on the timeline, information regarding the at least one service providing vehicle that is selected based on an end time of the content.

17. The video display device of claim 16, wherein the operations further comprise:
based on a change of the scheduled arrival time of the service providing vehicle by at least a threshold change amount, generating a control signal for changing a playback speed of the content to finish a playback of the content on or before the changed scheduled arrival time.

18. A method for controlling a video display device, the method comprising:
outputting, through a display unit of the video display device, a timeline that indicates a progress status of a task being executed, the task comprising displaying a content on the display unit;
transmitting, through a communication unit of the video display device to an external server and based on a user input, a request for a service providing vehicle;
controlling the display unit to display, on the timeline, information, received in response to the request, regarding at least one service providing vehicle selected based on an end time of the task being executed;

in a state in which the display unit displays the content, controlling at least one sensor of the video display device to sense whether a user views the content; and based on the at least one sensor detecting that the user does not look at the display unit for a predetermined time or longer, controlling the communication unit to transmit a request for canceling the at least one service providing vehicle and to transmit a request for another service providing vehicle.

19. The method of claim 18, further comprising:

executing the task by at least one of the video display device or an external device located within a first distance from the video display device.

20. The method of claim 19, further comprising:

controlling the display unit to display, on the timeline, an icon corresponding to the at least one service providing vehicle selected based on the end time of the task being executed; and controlling the display unit to change a position of the icon displayed on the timeline according to a remaining time for arrival of the at least one service providing vehicle.

* * * * *